(12) United States Patent
Broadfield

(10) Patent No.: US 10,486,464 B2
(45) Date of Patent: Nov. 26, 2019

(54) WHEEL SENSOR

(71) Applicant: Wheely-Safe Ltd., Staffordshire (GB)

(72) Inventor: Gary Broadfield, Staffordshire (GB)

(73) Assignee: Wheely-Safe Ltd., Staffordshire (GB)

( * ) Notice: Subject to any disclaimer, the term of this patent is extended or adjusted under 35 U.S.C. 154(b) by 80 days.

(21) Appl. No.: 15/573,988

(22) PCT Filed: Apr. 16, 2016

(86) PCT No.: PCT/GB2016/051043
§ 371 (c)(1),
(2) Date: Nov. 14, 2017

(87) PCT Pub. No.: WO2016/181102
PCT Pub. Date: Nov. 17, 2016

(65) Prior Publication Data
US 2018/0304679 A1    Oct. 25, 2018

(30) Foreign Application Priority Data

May 14, 2015 (GB) .................................. 1508237.3

(51) Int. Cl.
*B60B 27/00* (2006.01)
*B60B 3/16* (2006.01)
(Continued)

(52) U.S. Cl.
CPC ............ *B60B 27/0068* (2013.01); *B60B 3/14* (2013.01); *B60B 3/165* (2013.01); *G01M 17/013* (2013.01);
(Continued)

(58) Field of Classification Search
CPC .. B60B 3/14; B60B 3/16; B60B 3/165; B60B 27/0068; B60B 2900/112;
(Continued)

(56) References Cited

U.S. PATENT DOCUMENTS 4,709,654 A    12/1987  Smith
7,012,511 B2 *  3/2006  Hayes ....................... B60B 3/08
                                                340/438
(Continued)

FOREIGN PATENT DOCUMENTS

DE        19855856       6/1999
EP         1527904       5/2005
(Continued)

OTHER PUBLICATIONS

PCT Search Report dated Jul. 14, 2016 for corresponding PCT International Application No. PCT/GB2016/051043, 3 pages.
(Continued)

*Primary Examiner* — Hoai-An D. Nguyen
(74) *Attorney, Agent, or Firm* — Lee & Hayes, P.C.

(57) ABSTRACT

A wheel loosening sensor configured to detect loosening of a wheel of a vehicle, the wheel loosening sensor including: a water tight housing that is permanently sealed, wherein at least two electrical terminals are exposed at an exterior of the water tight housing. Within the water tight housing, there is a transmitter and a battery, the transmitter being configured to receive electrical power from the battery and to transmit a signal when the at least two electrical terminals are disconnected. The water tight housing including an electrically conductive element biased away from the at least two electrical terminals and configured to electrically connect the two electrical terminals when the bias is overcome.

22 Claims, 4 Drawing Sheets

(51) Int. Cl.
*B60B 3/14* (2006.01)
*G01M 17/013* (2006.01)

(52) U.S. Cl.
CPC .......... *B60B 3/16* (2013.01); *B60B 2900/112* (2013.01); *B60B 2900/113* (2013.01); *B60B 2900/115* (2013.01); *B60B 2900/3316* (2013.01); *B60B 2900/5112* (2013.01); *B60B 2900/5114* (2013.01)

(58) Field of Classification Search
CPC ......... B60B 2900/113; B60B 2900/115; B60B 2900/3316; B60B 2900/5112; B60B 2900/5114; B60R 25/00; B60R 25/10; B60R 25/1001; B60R 25/1004; B60R 25/30; B60R 2325/30; B60Q 1/00; B60T 2240/00
USPC ...... 324/71.1, 500, 503, 509, 510, 511, 512, 324/522, 525, 537, 600, 641, 718; 340/42.5, 426.1, 426.24, 426.33, 438, 340/440, 463, 500, 540, 686.1, 687; 361/1, 58, 67, 68, 268, 269, 270
See application file for complete search history.

(56) References Cited

U.S. PATENT DOCUMENTS

| | | | |
|---|---|---|---|
| 8,872,668 | B2 | 10/2014 | Schnare |
| 9,067,527 | B2* | 6/2015 | Broadfield ............... B60B 3/16 |
| 2002/0154023 | A1* | 10/2002 | Hazan ................. G08B 13/149 340/687 |
| 2008/0055059 | A1* | 3/2008 | Murakami .......... B60C 23/0408 340/442 |
| 2009/0284357 | A1 | 11/2009 | Ortega et al. |

FOREIGN PATENT DOCUMENTS

WO WO200213159 2/2002
WO WO2011121334 10/2011

OTHER PUBLICATIONS

GB Examination Report from corresponding GB Patent Application No. 1508237.3 dated May 13, 2016, 3 pages.
GB Search Report for corresponding GB Patent Application No. 1508237.3 dated Nov. 30, 2015, 3 pages.
Chinese Office Action from corresponding Chinese Patent Application No. 201680027737.X dated Mar. 13, 2019, 10 pages.

* cited by examiner under the sign

WHEEL SENSOR

This Application is a national-phase filing of PCT/GB2016/051043 filed Apr. 14, 2016, and which claims priority to GB Application 1508237.3, filed May 14, 2015, which is incorporated herein by reference.

TECHNICAL FIELD

The invention relates to wheel loosening sensors configured to detect loosening and/or loss of a wheel of a vehicle. More specifically, the invention relates to, but is not limited to, wheel loosening sensors configured to detect relative movement between a wheel and an axle of a vehicle. For example, sensors may be held against a wheel when the wheel is securely fixed to a vehicle.

BACKGROUND

Sensors and systems for notifying when a wheel of a vehicle is not securely fitted to the vehicle improve safety. Such sensors and systems allow preventative action to be taken prior to a wheel being lost, which prevents accidents and damage to vehicles, pedestrians and street furniture.

One such system is disclosed in WO2011/121334 and comprises a battery, a transmitter and a detector, or switch, operated by a coil spring. However, known sensors and systems are complex and costly to manufacture. Special dynamic seals are required to keep the area housing the electronics free from water ingress, whilst allowing movement of the switch. The complexity of known systems makes them more prone to failure. In addition, known sensors are likely to become damaged during use and maintenance of the vehicles to which they are fitted.

SUMMARY

According to the invention in one aspect, there is provided a wheel loosening sensor configured to detect loosening of a wheel of a vehicle, the wheel loss sensor comprising: a transmitter within a water tight housing that is permanently sealed, and wherein at least two electrical terminals are exposed at an exterior of the housing, the transmitter being configured to transmit a signal when the at least two electrical terminals are disconnected; an electrically conductive element biased away from the at least two electrical terminals and configured to electrically connect the two electrical terminals when the bias is overcome.

Optionally, the sensor further comprises a battery within the water tight housing, wherein the transmitter is configured to receive electrical power from the battery when the at least two electrical terminals are disconnected.

Optionally, the electrically conductive element comprises a disc spring configured to bias the electrically conductive element away from the at least two terminals.

Optionally, one or more spring elements of the disc spring are configured to contact the at least two electrical terminals when the bias is overcome.

Optionally, the electrically conductive element is mounted on a backing plate.

Optionally, the backing plate comprises one or more of; stainless steel; a polycarbonate; and an extruded metal material.

Optionally, the sensor further comprises a gasket secured to the housing surrounding the at least two electrical terminals, wherein the electrically conductive element is coupled to the gasket.

Optionally, the gasket comprises a resiliently deformable material configured to bias the electrically conductive element away from the at least two electrical terminals.

Optionally, the gasket forms a water tight seal with the exterior of the housing.

Optionally, the gasket forms a water tight seal with the backing plate.

Optionally, the gasket is secured to the housing and/or the backing plate by an adhesive.

Optionally, the sensor further comprises an extruded spring holder configured to extend along a sidewall of the sensor to cover the gasket.

Optionally, at least part of the housing comprises first and second parts ultrasonically welded together.

Optionally, at least part of the housing comprises a moulded plastics material, and wherein the at least two electrical terminals are moulded into the moulded plastics material.

Optionally, the sensor is configured to be coupled to a wheel, such that the bias is overcome when the wheel is securely fitted.

Optionally, the sensor is configured to be coupled to a bolt and wheel nut, such that the bias is overcome by a the sensor being held against a wheel hub.

Optionally, the sensor is configured to be coupled to a bracket secured to the wheel by a tightened wheel nut.

Optionally, the sensor is configured to be fitted in an aperture of a wheel hub, such that at least a part of the sensor stands proud of an internal face of the wheel hub.

Optionally, the sensor is configured to be coupled to a cap of a wheel, wherein the cap is configured to be secured within a central aperture of a wheel, and wherein at least a part of the sensor is configured to stand proud of an internal end of the cap.

According to the invention in a further aspect, there is provided a kit of parts comprising: a sensor according to any preceding claim; and a bracket configured to be secured to a wheel of a vehicle by a wheel nut and further configured hold the sensor against the wheel such that the bias of the electrically conductive element is overcome.

Optionally, the bracket is an extruded bracket configured to at least partly cover the sensor when the sensor is held against the wheel.

According to the invention in a further aspect, there is provided a wheel for a vehicle comprising any wheel loosening sensor described above secured thereto.

According to the invention in a further aspect, there is provided a vehicle comprising a wheel as described above.

BRIEF DESCRIPTION OF DRAWINGS

Exemplary embodiments of the invention are described herein with reference to the accompanying drawings, in which.

DETAILED DESCRIPTION

Generally, disclosed herein are exemplary sensors for use in detecting loosening of a wheel of a vehicle. The exemplary sensors are configured for simple construction having no dynamic seals. That is, the exemplary sensors comprise a housing that is permanently statically sealed and that houses the electronics required for operation of the sensor. Exemplary sensors may also include further features that provide benefits to mitigate or overcome the problems identified above and/or in the prior art.

As used herein, the term "dynamic seal" encompasses any seal between relatively movable parts of an apparatus. For example, where a first feature is required to move relative to another feature and there is necessarily a gap between the two features, a dynamic seal is one that seals the gap and yet still allows the relative movement of the two features. Such seals can be costly and complicated to manufacture, require finely toleranced components, and implementations and are prone to variations in thermal expansion and contraction, wear and failure.

Figure 1:
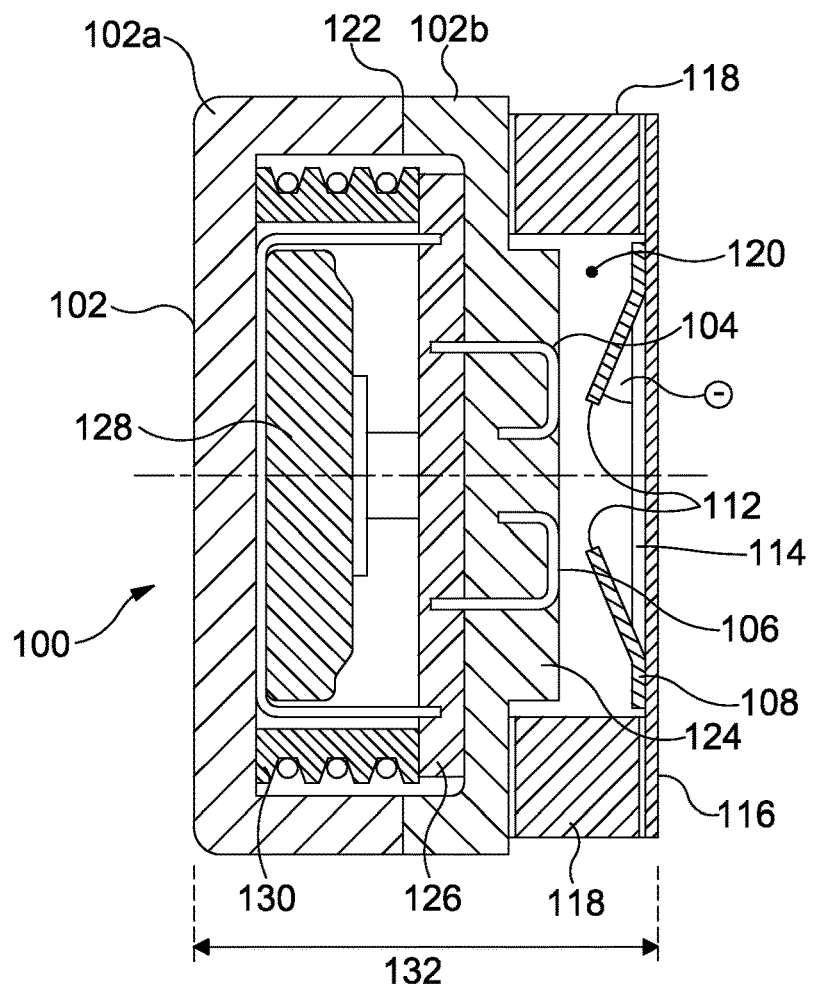
FIG. 1 is a section through a wheel loosening sensor in an open position.

FIG. 1 shows a section through an exemplary sensor 100. The sensor comprises a housing 102 that is permanently sealed such that it is water tight. Electronics for operation of the sensor 102 are sealed within the housing 102.

First and second electrical terminals 104, 106 are exposed at an exterior of the housing 102. That is, the first and second electrical terminals 104, 106 pass through the housing 102, such that they are electrically connected to the electronics therein and provide electrical contact points that may be accessed externally. In the exemplary sensor of FIG. 1, the first and second electrical terminals 104, 106 are each electrically connected to a circuit within the housing 102 and are separated from each other so as to form an open circuit. The circuit within the housing is operable in a first state when the first and second electrical terminals 104, 106 are electrically connected, and operable in a second state when the first and second electrical terminals 104, 106 are electrically disconnected. Further, in the exemplary sensor of FIG. 1, the first and second electrical terminals 104, 106 are statically sealed within the housing 102 and may be moulded into the housing 102 when, for example, the housing comprises a plastics material.

An electrically conductive element 108 is biased away from the first and second electrical terminals 104, 106. When the sensor 100 is in an open configuration, the electrically conductive element 108 is biased away from the first and second electrical terminals 104, 106 such that the electrically conductive element 108 is not in contact with at least one of the first and second electrical terminals 104, 106. When the sensor 100 is in a closed configuration, the bias acting on the electrically conductive element 108 is overcome and the electrically conductive element 108 electrically connects the first and second electrical terminals 104, 106. The electrically conductive element 108 may be a spring, such as a disc spring 110, as shown in FIG. 2.

Figure 2:
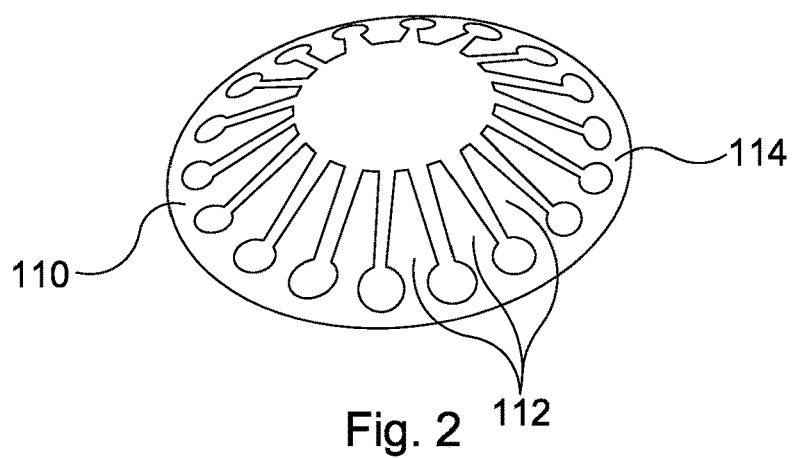
FIG. 2 is a perspective view of a disc spring.

Referring to FIGS. 1 and 2, the disc spring 110 comprises a plurality of spring elements 112. The spring elements 112 comprise resiliently deformable prongs extending from a base 114 of the disc spring 110. The spring elements 112 extend radially inwards and project outwards from a plane of the base 114 at an angle θ, such that a spring is formed. The disc spring 110 may at least partly provide the biasing force biasing the electrically conductive element 108 away from the first and second electrical terminals 104, 106. At least one of the spring elements 112 is configured to contact the first and second electrical terminals 104, 106 such that they are electrically connected. The spring elements 112 configured to contact the first and second electrical terminals 104, 106 are electrically connected. In exemplary sensors 100, the spring elements 112 and the base 114 comprise an electrically conductive material, such as a metal, such that the spring elements 112 are electrically connected to each other.

It is noted that any type of spring that comprises such prongs may be used and the spring need not be a disc shape. In other exemplary sensors, the electrically conductive element 108 may be any element that is configured to electrically connect the first and second electrical terminals 104, 106. The disc shape however does give the advantage of there being no need for spring orientation in the assembly process, greatly simplifying manufacture.

Referring back to FIG. 1, the electrically conductive element 108 is mounted on a backing plate 116. The backing plate 116 may comprise any material having a stiffness sufficient to hold the electrically conductive element 108 in the correct orientation with the first and second electrical terminals 104, 106. That is, the backing plate 116 is configured to present the electrically conductive element 108 to the first and second electrical terminals 104, 106 such that they are electrically connected when the biasing force acting on the electrically conductive element 108 is overcome. Exemplary backing plates 116 may comprise stainless steel and/or polycarbonate. The backing plate 116 may have a thickness in a range from 0.1 mm to 0.6 mm or in a range from 0.2 mm to 0.4 mm. Exemplary sensors take advantage of creating a very thin switch system in the knowledge that the backing plate will gain further strength from surfaces in the wheel loss application such as the very solid hub of a wheel.

A gasket 118 is secured to the housing 102 such that it surrounds the first and second electrical terminals 104, 106. The gasket 118 may be a ring gasket. The gasket 118 may comprise a compressible material that may be resiliently deformable, such that it at least pertly provides the force biasing the electrically conductive element 108 away from the first and second electrical terminals 104, 106. The gasket 118 may be adhered to the housing 102, for example, by a double sided adhesive tape. The backing pate 116 is secured to the gasket 118 and may be adhered to the gasket 118, for example, using a double sided adhesive tape. The gasket 118 may comprise a material that is impervious to water and is secured to the housing 102 and the backing plate 116, such that water may not ingress a void 120 comprising the electrically conductive element 108 and the first and second electrical terminals 104, 106.

As the gasket 118 is compressible and provides a water tight seal it allows for movement of the electrically conductive element 108 towards and away from the first and second electrical terminals 104, 106 without the need for dynamic seals between elements that move relative to each other.

The housing 102 comprises front and rear portions 102a, 102b configured to be connected together to form a permanent and static seal 122. The seal 122 may, for example, be formed by ultrasonic welding. The rear portion 102b of the housing 102 may comprise a plastics material. The first and second electrical terminals 104, 106 may be moulded into the rear portion 102b of the housing 102, such that they are in contact with the electronics within the housing 102 and are exposed to an exterior of the housing 102. The rear portion 102b comprises a raised area 124 within the void 120 and on which the first and second electrical terminals 104, 106 are exposed.

The housing 102 and the electronics within it may be termed the transmission engine. The electronics comprise a printed circuit board 126, a battery 128 and an antenna spool 130. The printed circuit board 126 comprises a transmitter configured to transmit a signal from the antenna spool 130. When the first and second electrical terminals 104, 106 are electrically disconnected, the electronics are configured such that an alert signal is transmitted from the antenna spool 130. The alert signal may be received by a further unit that may be in the vehicle and configured to provide a warning to the driver of the vehicle.

Figure 3:
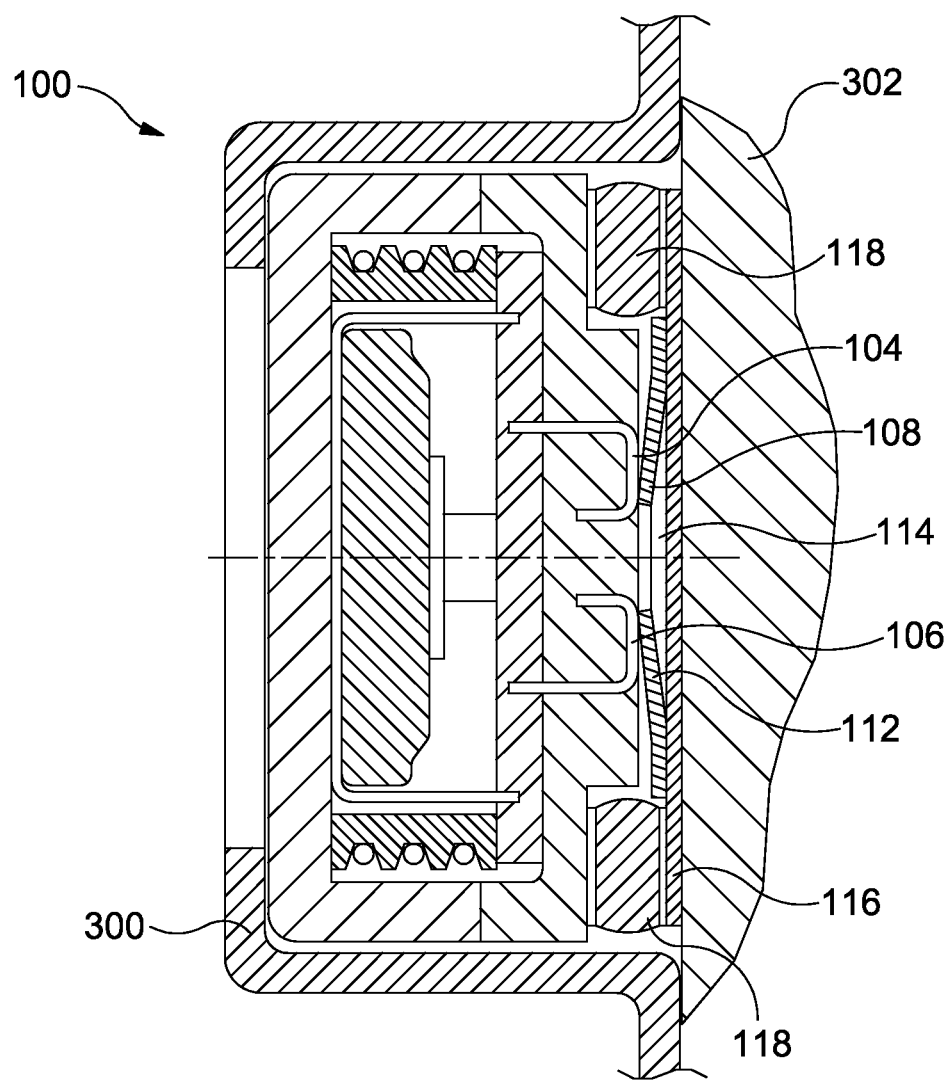
FIG. 3 is a section through a wheel loosening sensor in a closed position.

FIG. 1 shows the sensor 100 in an open configuration. FIG. 3, shows the sensor 100 in a closed configuration. In FIG. 3, the sensor 100 is held in the closed configuration by a bracket 300 that is secured to the wheel of the vehicle 302 by one or more of the wheel nuts (not shown). The bracket 300 holds the backing plate 116 against the wheel 302 such that the biasing force biasing the electrically conductive element 108 away from the first and second electrical terminals 104, 106 is overcome. The electrically conductive element 108 is therefore in contact with the first and second electrical terminals 104, 106 such that they are electrically connected and the circuit is made. The gasket 118 is compressed and the spring elements 112 of the disc spring 110 are deformed towards the plane of the base 114. The gasket 118 and/or the disc spring 110 therefore provide the biasing force to bias the electrically conductive element away from the first and second electrical terminals 104, 106.

In operation, the sensor 100 is secured against a wheel 302 of a vehicle by the bracket 300, which is secured by one or more wheel nuts. If the one or more wheel nuts become loose then the bracket 300 also becomes loose and this allows the sensor 100 to move away from the wheel 302. As the electrically conductive element 108 is biased away from the first and second electrical terminals 104, 106, it moves away from those terminals when the sensor 100 moves away from the wheel 302. If the movement of the electrically conductive element 108 away from the first and second electrical terminals 104, 106 is sufficiently large, the first and second electrical terminals 104, 106 become electrically disconnected and an alarm signal is transmitted.

In exemplary sensors, the height 132 of the sensor 100 in an open configuration is in a range from approximately 20 mm to 30 mm and may specifically be approximately 25 mm. When in the closed configuration, the height 132 of the sensor 100 is in a range from approximately 10 mm to 15 mm and may specifically be approximately 12.5 mm. These dimensions represent a low profile sensor 100 that protrudes from the wheel 302 of the vehicle only by around 12.5 mm when securely fitted. This provides the advantage that the sensor 100 is less likely to be damaged during use and/or maintenance of the vehicle. In addition, the sensor 100 is configured to be secured to a wheel of a vehicle by an extruded bracket 300 that shields the sensor while holding it against the wheel 302. The reduction in height is significant and allows the sensor to be used in more applications. The reduction in height also allows for the bracket 300 to be extruded over the top of the sensor 100 making it more robust and reducing the possibility of damage. The lower profile of the sensor ensures that the wheel fixing nuts are much taller than the sensor and bracket assembly ensuring that in instances such as kerbing (where the vehicle trailers wheel has side impact on kerbs) the sensor is fully protected.

The reduction in height (and diameter) of the sensor also allows it to be used more effectively with steel wheels whereby it can easily be mounted in the thickness of the wheel itself (typically 15 mm minimum), without significantly reducing the strength of the wheel. Further, as the sensor does not protrude above the top surface of the wheel hub, it is extremely difficult to damage.

Exemplary sensors also allow for easier sealing. Typical sensors using a mechanical switch configuration require various sophisticated dynamic sealing moulds and gaskets, whereas the exemplary sensors disclosed herein separate the transmission engine from the switch, which comprises the electrically conductive element 108 and the gasket 118. This means that the electronics can be housed in a permanently and statically sealed housing 102 and the sealing of the switch can be simplified. By removing all moving parts from the transmission engine, the dynamic sealing (which can wear) is not necessary. The transmission engine may be sealed by either ultrasonic welding of the top and rear portions 102a and b, in-mould of the electrical terminals 104, 106, or by simply silicone potting the assembly. This is made possible as all moving parts are taken away from the transmission engine.

In addition, there is a reduction in the number of parts and the complexity of the construction of the sensor, which in turn reduces overall cost of the Bill of Material (BOM) and the manufacturing process. Further, by having a sealed transmission engine with exposed terminals it is possible to keep the majority of the part standard, with the switch carrier varying with application.

The sensitivity of the sensor 100 can be changed by altering an angle of the spring elements 112 with respect to the base 114 of the spring 110. Sensitivity of the sensor may also be changed by altering the height of the sealing gasket 118, as this may increase the distance between the electrically conductive element 108 and the first and second electrical terminals 104, 106 when the sensor 100 is in the open configuration. Sensitivity changes may be required for various applications. The sensitivity of the sensor 100 may also be changed by increasing or decreasing the size of the biasing force biasing the electrically conductive element 108 away from the first and second electrical terminals 104, 106. This may increase the rate at which the electrically conductive element 108 separates from the first and second electrical terminals 104, 106 in the transition from the closed to the open configuration.

Figure 4:
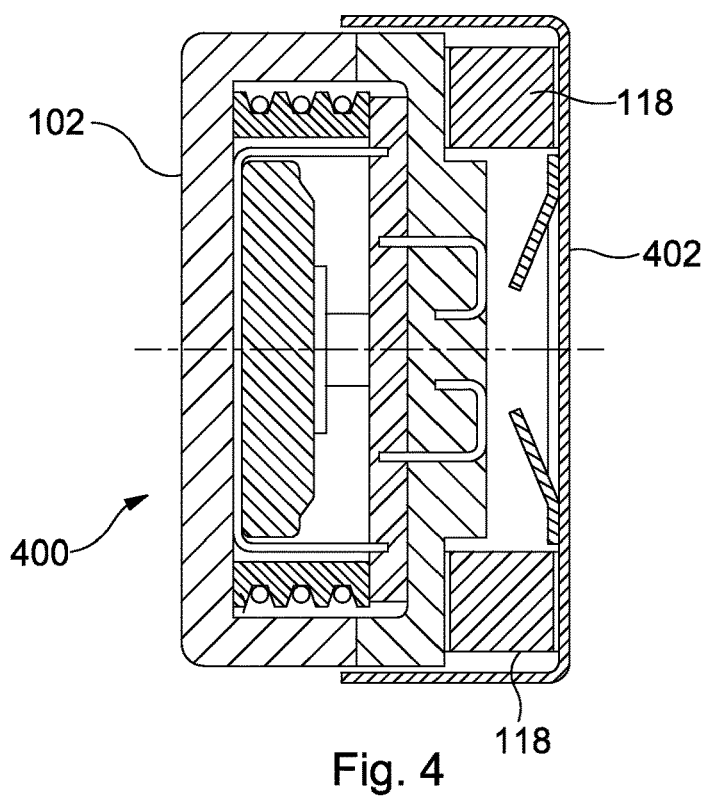
FIG. 4 is a section through a wheel loosening sensor in an open position.

In exemplary sensors, an extruded spring holder may be included. An example of such a sensor 400 is shown in FIG. 4. Many of the features of FIG. 4 are the same or similar to those shown in FIGS. 1 and 3 and are not therefore explained again in detail. It is noted that features of the sensor 400 of FIG. 4 may be used with any other exemplary sensor disclosed herein.

In FIG. 4, the backing plate has been extended such that it projects down a side wall of the housing 102 to form an extruded spring holder 402. The extruded spring holder provides protection of the gasket 118 against damage during fitting and wear due to exposure to the external environment. Because the gasket 118 provides a water tight seal with the spring holder 402 and the housing 102, there is no requirement for a dynamic seal between the housing 102 and the side portions of the extruded spring holder 402. However, a dynamic seal may be added, if desired. In other exemplary sensors, the extruded spring holder may be separate to the backing plate and may be secured to the backing plate.

Figure 5:
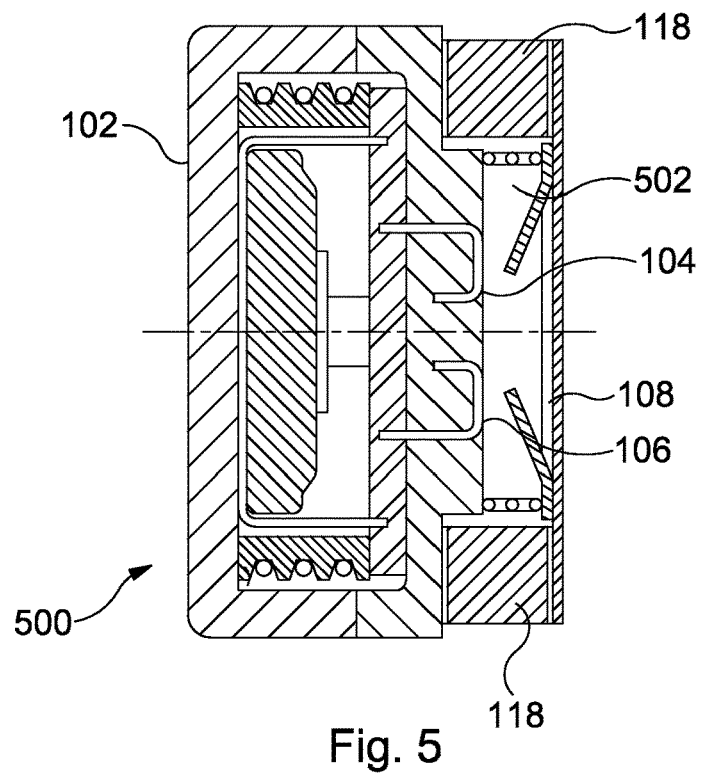
FIG. 5 is a section through a wheel loosening sensor in an open position.

Exemplary sensors may comprise a further spring configured to bias the electrically conductive element 108 away from the first and second electrical terminals 104, 106. An example of such a sensor 500 is shown in FIG. 5. Many of the features of FIG. 5 are the same or similar to those shown in FIGS. 1, 3 and 4 and are not therefore explained again in detail. It is noted that features of the sensor 500 of FIG. 5 may be used with any other exemplary sensor disclosed herein. The additional spring 502 may be used to increase the biasing force biasing the electrically conductive element 108 away from the first and second electrical terminals 104, 106. As already mentioned, this can improve the sensitivity of the sensor 500.

Figure 6:
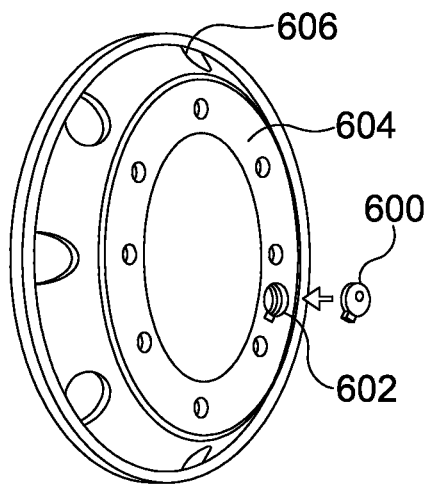
FIG. 6 is a figure showing a wheel hub and a sensor.

In other exemplary arrangements, and referring to FIG. 6, exemplary sensors 600 may be configured to be placed within an aperture 602 of a wheel 604. The aperture 602 may comprise a locating recess configured to engage with a locating lug positioned on the sensor 600 when the sensor is fitted within the aperture 602. The aperture and the sensor may be configured such that when the sensor 600 is fitted in the aperture 602, the sensor stands proud of the internal face of the wheel 604 when in the open configuration. When the wheel and tyre 606 are fitted to a wheel drum, the part of the sensor 600 that stands proud of the internal face of the wheel 604 comes into contact with the wheel drum, such that the force biasing the electrically conductive element is overcome. This places the sensor 600 in the closed configuration. If the wheel becomes loose, the wheel 604 (and the sensor 600) separates from the wheel drum, the sensor moves towards the open configuration and an alarm signal is transmitted.

Figure 7:
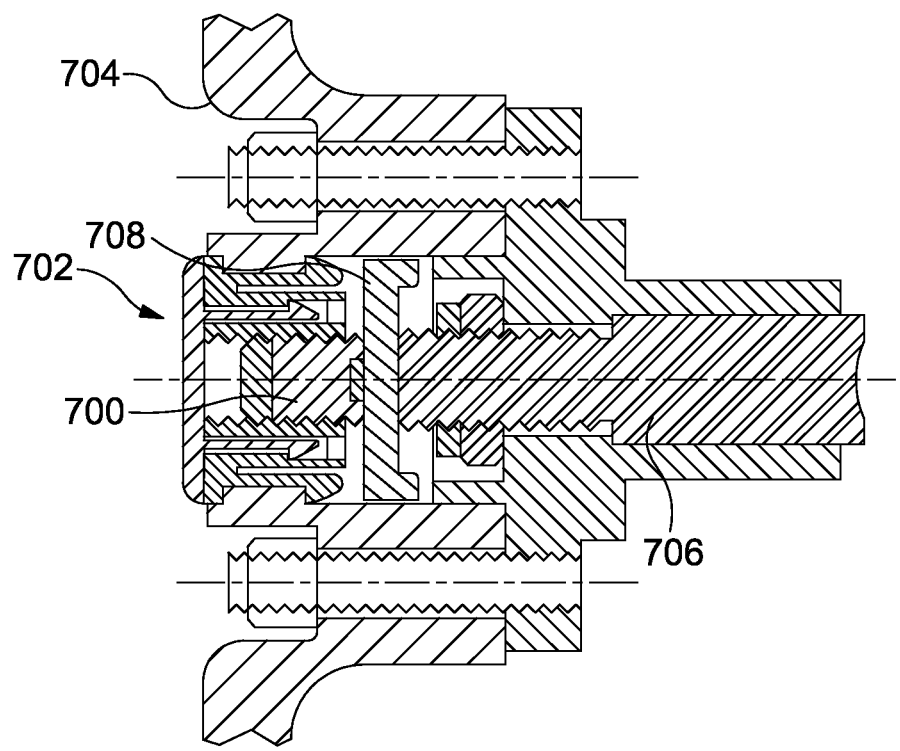
FIG. 7 is a section through a wheel having a cap secured within a central aperture therethrough.

In further exemplary arrangements, and referring to FIG. 7, exemplary sensors 700 may be configured to be coupled to a cap 702 of a wheel. The cap 702 may be configured to be secured within a central aperture of an alloy wheel 704, for example. The sensor 700 may be configured to be coupled to the cap 702 such that a part of the sensor 700 stands proud of an internal end of the cap 702 when in the open configuration. When the wheel 704 is fitted to an axle 706, the part of the sensor 700 standing proud of the internal end of the cap 702 is in contact with the axle 706 such that the biasing force acting on the electrically conductive element is overcome. This places the sensor 700 in the closed configuration. The sensor 700 may be directly or indirectly in contact with the axle 706. That is, the sensor 700 may be in contact with the axle 706 via a spacer element 708. If the wheel 704 becomes loose, the wheel 704 (and cap 702 and the sensor 700) separate from the axle 706 and the sensor moves towards the open configuration and an alarm signal is transmitted.

The skilled person will be able to envisage further embodiments without departing from the scope of the appended claims.

The invention claimed is:

1. A wheel loosening sensor configured to detect loosening of a wheel of a vehicle, the wheel loosening sensor comprising:
 a transmitter within a water tight housing that is permanently sealed, and wherein at least two electrical terminals are exposed at an exterior of the housing, the transmitter being configured to transmit a signal when the at least two electrical terminals are disconnected;
 an electrically conductive element biased away from the at least two electrical terminals and configured to electrically connect the two electrical terminals when the bias is overcome; and
 a gasket secured to the housing surrounding the at least two electrical terminals, wherein the electrically conductive element is coupled to the gasket.

2. A sensor according to claim 1, wherein the electrically conductive element comprises a disc spring configured to bias the electrically conductive element away from the at least two terminals.

3. A sensor according to claim 2, wherein one or more spring elements of the disc spring are configured to contact the at least two electrical terminals when the bias is overcome.

4. A sensor according to claim 1, wherein the electrically conductive element is mounted on a backing plate.

5. A sensor according to claim 4, wherein the backing plate comprises one or more of; stainless steel; a polycarbonate; and an extruded metal material.

6. A wheel for a vehicle comprising a wheel loosening sensor according to claim 1 secured thereto.

7. A sensor according to claim 1, wherein the gasket comprises a resiliently deformable material configured to bias the electrically conductive element away from the at least two electrical terminals.

8. A sensor according to claim 1, wherein the gasket comprises a resiliently deformable material configured to bias the electrically conductive element away from the at least two electrical terminals and the gasket forms a water tight seal with the exterior of the housing.

9. A sensor according to claim 1, wherein the electrically conductive element is mounted on a backing plate, and wherein the gasket forms a water tight seal with the backing plate.

10. A sensor according to claim 1, wherein the electrically conductive element comprises a disc spring configured to bias the electrically conductive element away from the at least two terminals, wherein one or more spring elements of the disc spring are configured to contact the at least two electrical terminals when the bias is overcome, and wherein the gasket is secured to the housing and/or the backing plate by an adhesive.

11. A sensor according to claim 7, further comprising an extruded spring holder configured to extend along a sidewall of the sensor to cover the gasket.

12. A sensor according to claim 1, wherein at least part of the housing comprises first and second parts ultrasonically welded together.

13. A sensor according to claim 1, wherein at least part of the housing comprises a moulded plastics material, and wherein the at least two electrical terminals are moulded into the moulded plastics material.

14. A sensor according to claim 1 configured to be coupled to a wheel, such that the bias is overcome when the wheel is securely fitted.

15. A sensor according to claim 14 configured to be coupled to a bolt and wheel nut, such that the bias is overcome by a the sensor being held against a wheel.

16. A sensor according to claim 15, configured to be coupled to a bracket secured to the wheel by a tightened wheel nut.

17. A sensor according to claim 14 configured to be fitted in an aperture of a wheel, such that at least a part of the sensor stands proud of an internal face of the wheel.

18. A sensor according to claim 14 configured to be coupled to a cap of a wheel, wherein the cap is configured to be secured within a central aperture of a wheel, and wherein at least a part of the sensor is configured to stand proud of an internal end of the cap.

19. A kit of parts comprising:
 a sensor according to claim 1; and
 a bracket configured to be secured to a wheel of a vehicle by a wheel nut and further configured hold the sensor against the wheel such that the bias of the electrically conductive element is overcome.

20. A kit of parts according to claim 19, wherein the bracket is an extruded bracket configured to at least partly cover the sensor when the sensor is held against the wheel.

21. A vehicle comprising a wheel according to claim 6.

22. A wheel loosening sensor configured to detect loosening of a wheel of a vehicle, the wheel loosening sensor comprising:
 a transmitter within a water tight housing that is permanently sealed, and wherein at least two electrical terminals are exposed at an exterior of the housing, the transmitter being configured to transmit a signal when the at least two electrical terminals are disconnected;
 an electrically conductive element biased away from the at least two electrical terminals and configured to electrically connect the two electrical terminals when the bias is overcome; and
 a gasket secured to the housing surrounding the at least two electrical terminals, wherein the gasket forms a water tight seal with the exterior of the housing, and wherein the electrically conductive element is coupled to the gasket.

* * * * *